United States Patent [19]

Weber

[11] Patent Number: 5,314,278
[45] Date of Patent: May 24, 1994

[54] EXPANSIBLE ANCHOR

[75] Inventor: Wilfried Weber, Schopfloch-Unteriflingen, Fed. Rep. of Germany

[73] Assignee: fischerwerke, Artur Fischer GmbH & Co. KG, Tumlingen 3/Waldachtal, Fed. Rep. of Germany

[21] Appl. No.: 72,591

[22] Filed: Jun. 4, 1993

[30] Foreign Application Priority Data

Jun. 19, 1992 [DE] Fed. Rep. of Germany ....... 4219984

[51] Int. Cl.$^5$ ............................................. F16B 13/06
[52] U.S. Cl. ........................................ 411/61; 411/55; 411/74
[58] Field of Search ................... 411/42, 55, 57, 60, 411/61, 74

[56] References Cited

U.S. PATENT DOCUMENTS

| | | | |
|---|---|---|---|
| 4,884,931 | 12/1989 | Revol et al. | 411/61 X |
| 4,904,135 | 2/1990 | Barthomeuf et al. | 411/55 |
| 4,917,552 | 4/1990 | Crawford | 411/60 X |
| 5,176,481 | 1/1993 | Schiefer | 411/55 X |

FOREIGN PATENT DOCUMENTS

| | | |
|---|---|---|
| 1475083 | 3/1969 | Fed. Rep. of Germany . |
| 2220313 | 1/1973 | Fed. Rep. of Germany . |
| 3528744 | 2/1987 | Fed. Rep. of Germany . |
| 3620573 | 2/1987 | Fed. Rep. of Germany ........ 411/55 |
| 3420375 | 3/1987 | Fed. Rep. of Germany . |
| 3509986 | 3/1988 | Fed. Rep. of Germany . |
| 3707510 | 10/1992 | Fed. Rep. of Germany . |
| 2628158 | 9/1989 | France . |
| 579223 | 8/1976 | Switzerland . |
| 624738 | 8/1981 | Switzerland . |
| 1303043 | 4/1987 | U.S.S.R. . |
| 1664120 | 7/1991 | U.S.S.R. . |
| 1670203 | 8/1991 | U.S.S.R. . |
| 1670204 | 8/1991 | U.S.S.R. . |
| 1217850 | 12/1970 | United Kingdom ................ 411/55 |

OTHER PUBLICATIONS

Befestigungstechnik, sbz 19/1989, p. 1428.

Primary Examiner—Neill R. Wilson
Attorney, Agent, or Firm—Michael J. Striker

[57] ABSTRACT

An expansible anchor for anchoring of an article to a component includes a shank having a portion of reduced cross-section at a front end, elements for fixing the article at a rear end, an adjoining expander cone at a rear end of the shank, and an expansible sleeve positioned over the shank portion of reduced cross-section and locking elements projecting beyond the diameter of the expansible sleeve. To allow the expander cone to enter the expansible sleeve for expansion of it even in the event the drilled hole becomes enlarged as a result of cracks being formed in its wall, the expansible sleeve is provided with a plurality of longitudinal slits so as to form expander arms. Each of the longitudinal slits extends over at least half the length of the expansible sleeve from a front end edge of the expansible sleeve and continues into an enlarged opening provided in the sleeve. The expansible sleeve also is provided with a plurality of notch-like indentations aligned with the slits and terminating at a distance from the enlarged openings to define a web whose length is advantageously chosen to facilitate spreading of the expansible sleeve.

12 Claims, 1 Drawing Sheet

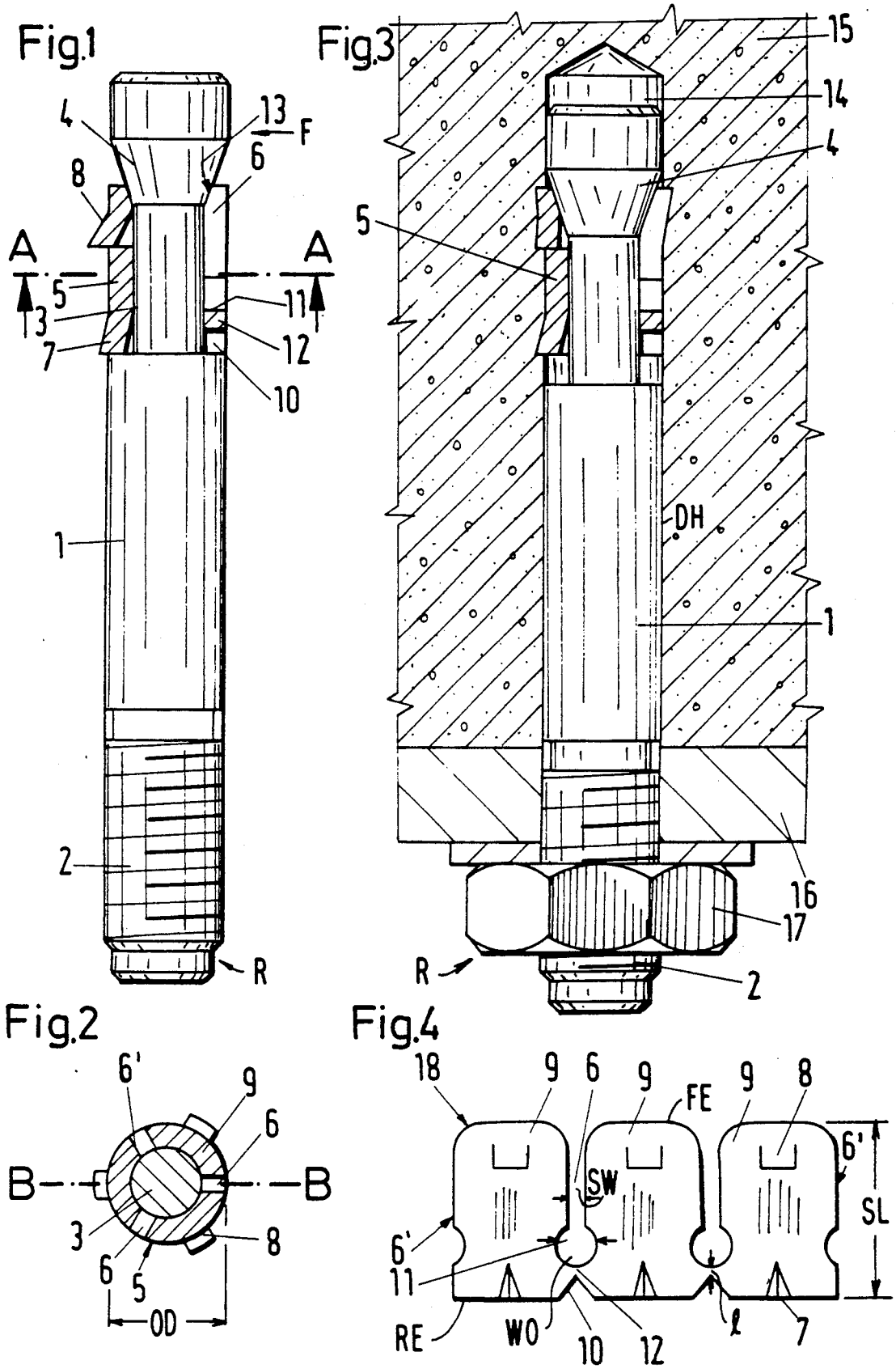

EXPANSIBLE ANCHOR

BACKGROUND OF THE INVENTION

The invention relates to an expansible anchor for anchoring an article to a component, especially a concrete part.

An expansible anchor for anchoring of an article to a component, e.g. a concrete part, is known including a shank, which has means for fixing an article at its rear end and a portion of reduced cross-section near its front end with an adjoining expander cone, an expansible sleeve having longitudinal slits and positioned over the shank portion of reduced cross-section and locking elements projecting from the expansible sleeve beyond an outer diameter of the expansible sleeve.

Expansible anchors of this type are especially suitable for use in hard building materials. The expansible anchor is inserted with its front end first into a drilled hole in the component and the article is placed over the projecting rear end of the shank. By screwing a nut onto the threaded rear end of the shank projecting beyond the component and the article to be fastened to it, the expander cone integrally formed with the shank is drawn into the expansible sleeve bearing against the wall of the drilled hole. The expansible sleeve is braced in the drilled hole by locking elements provided on it, which catch against the wall of the drilled hole.

The expansible sleeve is normally rendered expansible by several longitudinal slits in it. The longitudinal slits create expansible arms, but at the rear end edge of the longitudinal slits the expansible sleeve has a closed sleeve shape. To expand the expansible arms it is therefore necessary to bend open the arms beyond a line connecting the ends of the two longitudinal slits defining the arms. A considerable expansion force is required for that purpose, depending first on a wall thickness of the expansible sleeve and second on the width of the arms and additionally their outer shape. A certain width of expansible arms is nevertheless required to achieve satisfactory holding forces with the expansible anchor.

By suitably matching the cone angle, it is possible to draw the expander cone into the expansible sleeve using a reasonable torque, in so doing expanding the expansible sleeve to effect anchoring. The resistance of the expansible arms to expansion is, however, too high to allow the expander cone to slide-up subsequently if the drilled hole should widen as a result of cracks forming. This inability of the expansible sleeve to expand subsequently means that the known expansion anchors are not suitable for use in the tensile zone in which cracks can form in a wall of the drilled hole as a result of tensile stresses occurring in the concrete. If the drilled hole enlarges because of crack formation, the expansible sleeve of the known expansion anchors is unable to compensate for this enlargement, so that even a light load causes the anchor to be pulled out of the drilled hole.

SUMMARY OF THE INVENTION

It is an object of the present invention to provide an expansible anchor which guarantees reliable fixing in the tensile zone of an article to the concrete part.

According to the invention, an expansible anchor for anchoring an article to a component includes a shank having a portion of reduced cross-section in the vicinity of its front end, means for fixing the article at its rear end, an adjoining expander cone at the front end of the shank, an expansible sleeve positioned over the shank portion of reduced cross-section, having locking elements projecting beyond its outer diameter and being provided with a plurality of throughgoing longitudinal slits. Each of the longitudinal slits extends over at least half the sleeve length from a front end edge of the sleeve and continues into an enlarged opening provided in the sleeve. The enlarged opening has a width greater than the longitudinal slit width. The expansible sleeve also is provided with a plurality of notch-like indentations aligned with the slits and terminating at a distance from the enlarged openings to define a web which facilitates expansion of the expansible sleeve by the expander cone, particularly in the tensile zone.

The longitudinal slits starting at the front end edge and extending for at least half the length of the expansible sleeve create expansible arms which can be spread by drawing in the expander cone integrally formed with the shank. At the end of the longitudinal slits there are enlarged openings in the wall of the expansible sleeve, which are preferably in the form of circular punched holes. These punched holes first prevent the expansible sleeve tearing as it is expanded and, second, facilitate the hinge-like opening or spreading of the expansible arms. The indentations starting from the rear end edge of the sleeve and aligned with the longitudinal slits enable the spreading of the expansible arms to be enabled by the webs remaining between the indentations and the punched holes. The indentations are provided in the rear edge of the expansible sleeve so that as the expansible arms spread out it is possible for the rear edge to bend inwards with a lever-like action. The resistance of the expansible arms to expansion is thereby reduced, so that even the slightest tensile forces on the shank allow the expansible sleeve to expand and thus the expander cone to enter the expansible sleeve further. When the expansible anchor is anchored in the tensile zone of a concrete part and on the appearance of a crack, with the associated enlargement of the drilled hole, the load acting on the expansible anchor is sufficient to bend out the expansible arms further, as a result of the expander cone sliding further into the expansible sleeve, and thus to accommodate the enlargement of the drilled hole and to re-anchor the expansible anchor in the drilled hole. Because the expansible sleeve expands readily, the expansible anchor according to the invention is therefore rendered suitable for use in the tensile zone.

Especially favorable lever ratios are obtained with a length of the webs that corresponds approximately to a wall thickness of the expansible sleeve.

Triangular indentations converging towards the front end edge of the sleeve make it easy for the rear end edge of the sleeve to bend inwards.

To achieve a reliable fixing of the expansible sleeve for expansion and in particular also when enlargement of the drilled hole occurs, it is advantageous to provide the expansible sleeve at its rear end edge with arrow-like troughs and at its front end edge with resilient tongues as locking elements. The locking elements, which are structured to resist withdrawal of the shank in an axial direction out of the drilled hole, catch in the wall of the drilled hole and therefore prevent the expansible sleeve from shifting.

To improve the frictional characteristic between the expander cone and the expansible sleeve, the inner side of the front end edge of the expansible sleeve may have a beveled surface. Furthermore, for the same purpose the front corner edges of the expansible arms of the expansible sleeve may be rounded. The reduction in friction also facilitates the subsequent drawing of the expander cone into the expansible sleeve should the drilled hole become enlarged.

BRIEF DESCRIPTION OF THE DRAWINGS

The objects, features and advantages of the present invention will now be illustrated in more detail by the following detailed description, reference being made to the accompanying drawing in which:

FIG. 1 is a partially cross-sectional, partially side elevational view of an expansible anchor according to the invention with an expansible sleeve, the cross-section being taken along section line B—B of FIG. 2;

FIG. 2 is a cross-sectional view through the expansible anchor shown in FIG. 1 taken along section line A—A of FIG. 1;

FIG. 3 is a cross-sectional view showing the expansible anchor of FIG. 1 for anchoring an article to a concrete part; and FIG. 4 is a developed view of the expansible sleeve of the expansible anchor of FIG. 1 in the form of a punched and bent element.

DESCRIPTION OF THE PREFERRED EMBODIMENTS

The expansible anchor illustrated in FIG. 1 consists of a shank 1 having at its rear end R a threaded portion 2 for clamping an article 16 tightly to a concrete part 15. In vicinity of the front end F of the shank 1 there is a reduced diameter portion 3 adjoining which at the front end there is an expander cone 4. An expansible sleeve 5, the expansible portion of which is formed by longitudinal slits 6 in or starting from the front end edge FE of the sleeve 5, is arranged in the vicinity of the reduced diameter portion 3. Each of the longitudinal slits 6 is bounded by an enlarged opening 11. Each of the longitudinal slits 6 has a slit width SW which is larger than the circumferential width WO of the associated enlarged opening 11, which can be a circular punched hole.

To fix the expansible sleeve 5 in the drilled hole DH, locking elements 7,8 are provided in the expansible sleeve 5. At the rear end edge RE of the expansible sleeve 5 the locking elements 7 are arrow-like throughs 7 and at the front end edge RE the locking elements 8 are resilient tongues 8. The locking elements 8 are inclined inwardly in the direction of the front end edge FE so that they can bend into the drilled hole DH as the expansible anchor is driven in the drilled hole. The locking elements project beyond the outer diameter OD of the expansible sleeve. Because the projecting end edges of the locking elements 7,8 can catch in the wall of the drilled hole, the expansible anchor is secured against axial motion in a withdrawal direction.

FIG. 2 shows that the longitudinal slits 6,6' form several expansible arms 9, which expand to anchor the expansible anchor as the expander cone 4 is drawn into the expansible sleeve 5. The spreading of the expansible arms 9 is facilitated by the notch-like indentations 10 provided in the expansible sleeve 5. These notch-like indentations 10 are provided in the rear end edge RE and are located so that they align with the longitudinal slits 6. The indentations 10, which are preferably triangular (see FIG. 4), terminate at a distance 1 from the enlarged opening 11, so that a web 12 remains so that the expansible arms 9 can be spread in a hinge-like manner. To reduce friction in operation, it is advantageous to provide the inner side of the front end edge FE of the expansible sleeve 5 with a beveled surface 13.

FIG. 3 shows the expansible anchor anchored in a hole 14 drilled in a concrete part 15. The anchoring, and at the same time the clamping of the article 16 to be fastened, is effected by screwing a nut 17 onto the threaded portion 2 of the expansible anchor. By axial displacement of the shank 1 of the expansible anchor, the expander cone 4 is drawn into the expansible sleeve 5 held captive in the drilled hole by the locking elements 7,8 to effect the anchoring of the expansible sleeve.

FIG. 4 shows a developed view of an expansible sleeve 5 punched from sheet metal with three expansible arms 9. Each expansible arm 9 is provided with two locking elements, the resilient tongue 8 being arranged at the front end edge FE of the expansible arm 9 and the arrow-like trough 7 being arranged at the rear end edge RE thereof. The expansible arms 9 are formed by the longitudinal slits 6 and the edge 6' of the roll and are bounded by the enlarged openings 11. Furthermore, the punched component is already provided with the indentations 10. The expansible anchor according to the invention is created by bending the punched component onto the reduced portion 3 of the shank 1 to reduce the friction between the expander cone and the expansible sleeve, the front corner edges of the expansible arms 9 are rounded at 18.

While the invention has been illustrated and described as embodied in an expansible anchor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. An expansible anchor for anchoring of an article to a component, said expansible anchor including a shank having a rear end, a front end and a portion of reduced cross-section in the vicinity of said front end, means for fixing the article at said rear end, an adjoining expander cone at said front end of said shank, and an expansible sleeve having a front end edge, a rear end edge, an outer diameter and a sleeve length, said expansible sleeve being positioned over said portion of reduced cross-section, having locking elements projecting beyond said outer diameter and being provided with a plurality of throughgoing longitudinal slits, each of said longitudinal slits extending over at least half the sleeve length from said front end edge, having a slit width and continuing into an enlarged opening provided in the sleeve, said enlarged opening having a width greater than said slit width, said expansible sleeve also being provided with a plurality of notch-like indentations aligned with said slits and terminating at a distance from said enlarged openings to define a web so as to facilitate expansion of said expansible sleeve by said expander cone, each of said webs having a length approximately equal to a wall thickness of said expansible sleeve, said length being in a longitudinal direction of said expansible sleeve.

2. Expansible anchor as defined in claim 1, wherein each of said enlarged openings consists of a circular punched hole.

3. Expansible anchor as defined in claim 1, wherein each of said notch-like indentations is triangular in shape.

4. Expansible anchor as defined in claim 1 wherein said locking elements comprise arrow-like throughs in said rear end edge of said expansible sleeve and resilient tongues in said front end edge of said expansible sleeve.

5. Expansible anchor as defined in claim 1, wherein an inner side of said front end edge of said expansible sleeve has a beveled surface.

6. Expansible anchor as defined in claim 1, wherein said expansible sleeve has a plurality of expansible arms between said longitudinal slits and each of said expansible arms has front corner edges and said front corner edges are rounded.

7. An expansible anchor for anchoring of an article to a component, said expansible anchor including a shank having a rear end, a front end and a portion of reduced cross-section in the vicinity of said front end, means for fixing the article at said rear end, an adjoining expander cone at said front end of said shank, and an expansible sleeve having a front end edge, a rear end edge, an outer diameter and a sleeve length, said expansible sleeve being positioned over said portion of reduced cross-section, having locking elements projecting beyond said outer diameter and being provided with a plurality of throughgoing longitudinal slits, each of said longitudinal slits extending over at least half the sleeve length from said front end edge, having a slit width and continuing into an enlarged opening provided in the sleeve, said enlarged opening having a width greater than said slit width, said expansible sleeve also being provided with a plurality of notch-like indentations aligned with said slits and terminating at a distance from said enlarged openings to define a web so as to facilitate expansion of said expansible sleeve by said expander cone, each of said notch-like indentations being triangular in shape.

8. Expansible anchor as defined in claim 7, wherein each of said enlarged openings consists of a circular punched hole.

9. Expansible anchor as defined in claim 7, wherein each of said webs has a length approximately equal to a wall thickness of said expansible sleeve, said length being in a longitudinal direction of said expansible sleeve.

10. Expansible anchor as defined in claim 7, wherein said locking elements comprise arrow-like throughs in said rear end edge of said expansible sleeve and resilient tongues in said front end edge of said expansible sleeve.

11. Expansible anchor as defined in claim 7, wherein an inner side of said front end edge of said expansible sleeve has a beveled surface.

12. Expansible anchor as defined in claim 7, wherein said expansible sleeve has a plurality of expansible arms between said longitudinal slits and each of said expansible arms has front corner edges and said front corner edges are rounded.

* * * * *